Dec. 26, 1939.   R. S. BABCOCK ET AL   2,184,561
METHOD OF AND APPARATUS FOR CUTTING METALS
Filed Feb. 11, 1937   3 Sheets-Sheet 1

INVENTORS
ROGER S. BABCOCK
JOHN M. GAINES, JR.
BY
*E. L. Greenewald*
ATTORNEY

Dec. 26, 1939.   R. S. BABCOCK ET AL   2,184,561
METHOD OF AND APPARATUS FOR CUTTING METALS
Filed Feb. 11, 1937   3 Sheets-Sheet 2

INVENTORS
ROGER S. BABCOCK
JOHN M. GAINES, JR.
BY
ATTORNEY

Dec. 26, 1939.   R. S. BABCOCK ET AL   2,184,561
METHOD OF AND APPARATUS FOR CUTTING METALS
Filed Feb. 11, 1937   3 Sheets-Sheet 3

INVENTORS
ROGER S. BABCOCK
JOHN M. GAINES, JR.
BY
ATTORNEY

Patented Dec. 26, 1939

2,184,561

UNITED STATES PATENT OFFICE 2,184,561

METHOD OF AND APPARATUS FOR CUTTING METALS

Roger S. Babcock, Newark, N. J., and John M. Gaines, Jr., Kenmore, N. Y., assignors to The Linde Air Products Company, a corporation of Ohio Application February 11, 1937, Serial No. 125,212

25 Claims. (Cl. 148—9)

This invention relates to the art of cutting metals and particularly to a process and apparatus for cutting relatively thick bodies of metal at high speed by means of gaseous heating and oxidizing jets.

A specific example of one application of such a process is found in the manufacture of steel where the problem of producing cuts in steel slabs two to three inches thick at a temperature of 2000° F. has been investigated. In the steel mills a considerable demand exists for bars of twelve inch width, and since no means has heretofore been available for cutting hot slabs into long bars economically and at high speed, it has been necessary to roll twelve inch material on a twenty-four inch mill. It has been found that an economy in mill operation may be effected if the mill may operate upon stock of full twenty-four inch width, which subsequently could be cut or split lengthwise by means of an oxy-fuel gas cutting operation to give two bars each approximately twelve inches in width. Estimates indicated that a successful carrying out of this process would reduce the rolling cost considerably, provided the speed of severing could be increased to a satisfactory value without too great an increase in the cost thereof. It will be apparent, therefore, that the high speed cutting of hot steel slabs is important not only because of the increased speed, but also because it offers the possibility of continuous mill operation with attendant economy resulting from less handling, and obviating the time lost in cooling, in cutting by the conventional method, and reheating for subsequent rolling.

Considerable difficulty has been encountered, however, in attempts made heretofore to solve this problem. This has been due primarily to the fact that when the slabs come from the rolling mill in a heated condition the surfaces thereof are coated with a thick scale or coating of oxide. In applying an ordinary cutting oxygen jet to the surface of such a body of metal at an angle of about 90°, the oxide will be blown upwardly in such a manner as to cause a clogging of the usual preheating orifices of the cutting torch, with resultant backfiring. Moreover, in addition to this difficulty, it actually has not been possible heretofore to cut two inch material with the speed required to effect a saving in the mill operation.

One of the principal objects of the present invention, therefore, is to provide a process and apparatus for cutting thick plates at high speed which will not be subject to the above mentioned disadvantages, and which will allow the cutting to proceed with greater speed and efficiency than has heretofore been possible. Other and more specific objects are to provide: a process of flame cutting metals at high speed in which two independent streams of oxidizing gas are utilized and are of such velocities that the slag produced is delivered in two directions, thereby reducing the amount of slag flowing downwardly through the kerf; such a process in which oxygen, in a stream or portion of a stream having a relatively low velocity is employed for preheating the metal to be cut; such a process in which two low velocity streams of oxygen following the main cutting jet are utilized to square, smooth, or trim the edges of the cut or kerf; and a process and apparatus by means of which hot slabs of two inch thickness may be cut at a speed of at least thirteen feet per minute and whereby metallic bodies of other thicknesses may be cut at greater or lesser speeds as the thickness may determine.

The above and other objects of the invention will become apparent from the following description having reference to the accompanying drawings, in which.

Figure 2:
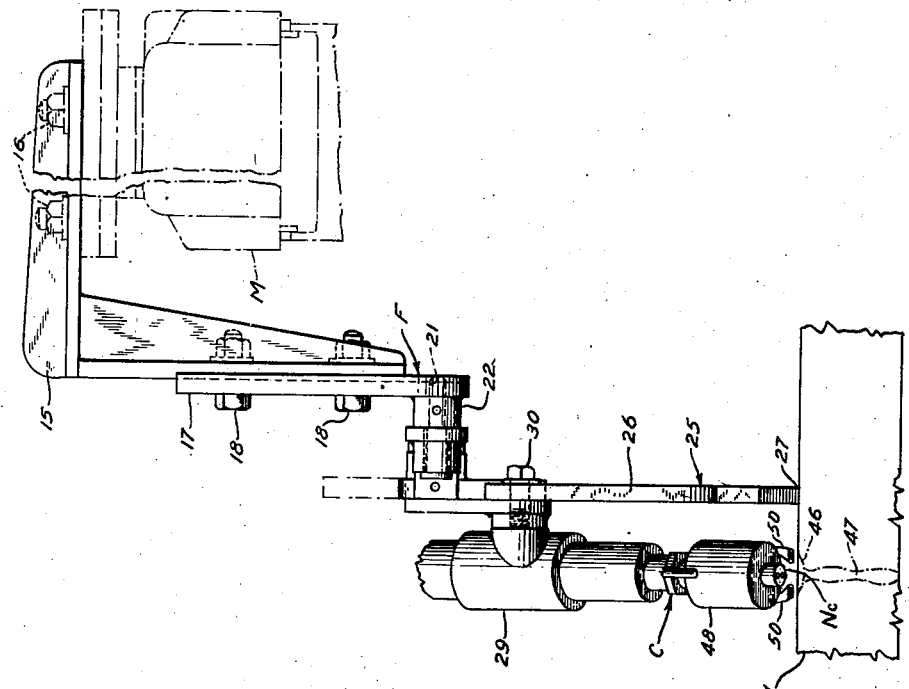
Figs. 1 and 2 are, respectively, fragmentary side and front elevational views of one form of apparatus which may be utilized for producing smooth cuts in thick metallic bodies at high speed in accordance with the principles of the present invention;

Oxy-acetylene cutting is primarily a chemical process based on the remarkable chemical affinity of oxygen for ferrous metals when at and above kindling temperatures. When commercially pure oxygen is brought in contact with most steels or iron, at the kindling point, a very active chemical reaction between them results. In addition to the chemical reaction, however, there is a noticeable and very helpful mechanical effect produced by the kinetic energy or motive power of the cutting oxygen stream, which washes away some of the metal in unoxidized or metallic form. The process is, therefore, one combining preheating continuously ahead of the cut, melting and oxidation of iron, and the displacement of slag.

The ordinary cutting process consists of preheating the material to be cut to the kindling or ignition temperature and rapidly oxidizing it by means of a closely regulated jet of oxygen. Preheating of the metal to the kindling temperature is usually accomplished by means of oxy-fuel gas preheating flames which customarily surround the cutting jet of oxygen and vary in number and size with the composition and thickness of the metal and the condition of its surface. It will be apparent, therefore, that the speed of the ordinary cutting process employed upon a ferrous metal of predetermined thickness, will be dependent upon, and limited by, the condition of the top surface of the metal being cut and the rate at which heat can be transferred to the metal by the preheating flames.

In conventional cutting practice, it is customary to move the nozzle at speeds high enough to cause a "lag" or "drag" of the oxygen stream which may be, for example, approximately ten percent of the thickness of the metal. The "lag" or "drag" may be defined as the horizontal distance from the point of entry to the point of emergence of the cutting oxygen stream during the progress of a cut. It will be obvious that the lag increases with the speed. Moreover, the tendency toward formation of firmly adhering slag increases with the lag, because, owing to the scouring action of the slag stream, high lag cutting is attended by removal of considerable quantities of pure molten iron. If, in conventional cutting, excessive cutting speeds are attempted, the lag increases to a point where the oxygen stream fails to emerge through the bottom of the workpiece and merely produces a groove.

In view of the foregoing, it will be seen that, if a combination of means are provided to effect a rapid preheating and, at the same time, while carrying large lags, properly to discharge the exhaust products, high cutting speeds will result.

In accordance with the present invention, both of these conditions are enhanced considerably by employing independent streams or jets of oxygen to effect the preheating and cutting, and by inclining the cutting jet at an appropriate angle to the metal surface to compensate for the lags occasioned by high cutting speeds. The first of these streams is preferably of relatively low velocity, and may be termed a deseaming stream or jet since it is directed upon the surface of the metal in such a manner as to establish and maintain a reaction zone or puddle as the torch and work are moved relatively to one another. Furthermore, such a low velocity oxygen jet, which is preferably directed upon the surface of the metal at an acute angle, will effectively remove any slag or oxide on the surface of the metal causing it to be blown forward, thereby producing a shallow groove along the line of the cut. In addition to the clean surface thus exposed by the low velocity stream, considerably more heat is transferred to the adjoining metal than it is possible to transmit with the ordinary quantity of preheat available from oxy-fuel gas flames. It will be understood that more than one of these low velocity streams may be employed, if desired, to effect a preheating of the metal to be cut. Preferably immediately behind such low velocity oxygen stream or streams is a stream of oxygen, preferably a high velocity cutting jet, which is directed upon and preferably at an acute angle to the cleaned metal surface at a point in the rearward portion of the reaction zone or puddle produced by the preceding low velocity oxygen stream or streams. This second oxygen stream, or high velocity cutting jet, cuts through the film of molten metal and downwardly through the remaining thickness of the workpiece. Both the high and low velocity jets of oxygen are preferably directed upon the metal to be cut at an angle of about 60°. Although it should be understood that this angle is for most purposes the optimum angle for both jets it is not necessary for both jets to be directed at the same angle to the surface. For example, the leading low velocity jet may be directed upon the surface at an angle of from 10° to 70°, or at any angle which will allow it to propagate a puddle; and the high velocity stream may be directed upon the surface at an angle from 10° to 90°, which angle does not have to be the same as that for the low velocity stream.

It will be noted that one distinguishing feature of this process is that the cutting is performed simultaneously by two or more streams of oxygen or cutting gas, acting at the same or substantially the same point, and of such velocities that the slag produced is delivered in two directions, i. e., the first or low velocity stream or streams blows the slag out over the surface of the metal being cut, while the second or high velocity cutting jet performs in the usual manner, forcing the slag down through the kerf. As a result of this action less slag is transferred downwardly through the kerf than if one jet alone performed the cutting. Furthermore, the oxygen streams act independently and preferably do not merge or otherwise reinforce one another at any point in the kerf. Since two cutting streams usually will not merge without producing turbulence in the resulting stream, it will be apparent that the independence of the two jets contributes considerably toward avoiding turbulence and thereby enhances the cutting speed and smoothness of the cut faces.

Following the above described procedure, accurate cuts may be effectively made in steel stock of two inch thickness at a speed of thirteen feet per minute when said stock is preheated to a temperature of approximately 2000° F., which is substantially the same as the temperature of hot slabs as they come from the rolling mill; and steel stock of other thicknesses may be cut at greater or lesser speeds as the thickness may determine. With cold stock of the same thickness the rate of cutting will be reduced to approximately half of the above mentioned speed. When cutting at such speeds the high velocity cutting stream will be deflected backwardly by the uncut metal in the kerf and thereby result in the production of a lag which may reach as much as three inches on a bar two inches thick. However, as a result of the acute angle between the cutting stream and the surface being penetrated, the large lag brought about by the high cutting speed is compensated for and emergence of the exhaust stream is assured. Due to the deflection of the oxygen stream, the kerf will become somewhat wider toward the bottom thereof. While this lack of squareness is not objectionable in the cutting of hot slabs as they pass from the rolling mill, it may nevertheless be desirable to trim the edges of the cut material so that they will be flat and square with the upper surface and thereby meet the most exacting specifications. This may be accomplished by directing a stream of oxygen upon each face of the cut produced as described above. Divergently positioned streams of oxygen having a low velocity (less than 1000 feet per second) will produce good results, though higher velocities may be utilized, if desired. These two finishing jets may be applied at an appropriate distance behind the main cutting jet and in such manner as to strike the kerf faces at a slight angle, though if desired they may be arranged substantially parallel to the kerf faces. By the action of these finishing streams, the protruding metal of the kerf faces is removed, leaving a substantially plane and smooth surface.

If the surface of the material to be cut is substantially free from the heavy oxide coating which forms on hot steel, as in cold metal covered only with normal mill scale, it has been found that the independent low velocity jet of oxidizing gas may be omitted and yet the same general principles may be applied to cut such metal at high speed. That is, a single high velocity jet of oxygen may be applied to a surface of a metal body in such a manner and at such an angle that the low velocity fringe of the cutting jet may be utilized to effect a deseaming action such as that shown in Fig. 3, and supply sufficient preheat to allow high speed propagation of a cut over normal mill scale surface. During such action of the stream of oxygen a small semi-circular preheated lip, resembling a miniature deseaming puddle, precedes the cut and a small fin appears on the top edges adjoining the cut, indicating further that a deseaming action is taking place. Moreover, there is a sharp reversal of the direction of the cutting stream below its point of entry which results in the production of a small wedge-shaped tongue of metal above such point of reversal and a mechanical reaction of the stream against the metal takes place, bringing about a heavy scouring action against the uncut metal with the attending rapid advance of the cut.

Whereas the conventional cutting process, in which the nozzle is carried substantially perpendicularly to the surface of the work, depends on the oxy-acetylene preheating flames to heat the lip of the advancing cut to kindling temperature, the present high speed process, in which the nozzle and its stream of oxygen are inclined at an acute angle to the surface of the work, utilizes a low velocity jet or the fringe of the cutting jet, which, because of its angle of inclination acts in a manner similar to a deseaming jet. A small puddle of metal, which serves as a very efficient source of preheat, is propagated ahead of the cut and an increase in the rate at which preheating can be accomplished is the direct result. Further, the rapid oxidation of the wedge-shaped tongue referred to above serves as an additional means of rapid preheat.

It will thus be apparent that when a single stream of oxygen is employed to cut metals at high speed in accordance with the principles of the present invention, such stream is preferably inclined forwardly at an acute angle to the surface of the work. This inclination will cause the stream to effect a rapid preheating of the metal by carrying a small preheating puddle ahead of the cut; will compensate by the forward direction of the cutting jet for the high lag which rapid cutting produces; and will cause an effective scouring action owing to the reaction attending the stream's change of direction. The quality of the cut edge is such as to make the process useful in any case where the main requisite is to cut steel rapidly to a rough dimension, though it will be understood that the edge faces may be trimmed to a more accurate finish, if desired.

Cuts made at high speed are usually characterized by heavy beads of slag adhering to the underside. This condition can be greatly alleviated by directing a high velocity oxidizing gas stream into the exhaust stream and at the point where said stream leaves the work. The effect of such an oxidizing stream is twofold: the exhaust products are deflected downwardly away from the underside of the work; and, at the same time, the pure iron, or at least a large part thereof, contained in the slag is oxidized and rendered less liable to adhere to the bottom of the kerf.

The above described method of producing a smooth cut in a thick metal plate at high speed will be more readily understood from the following description of one form of apparatus with which such method may be practiced.

Figure 1:
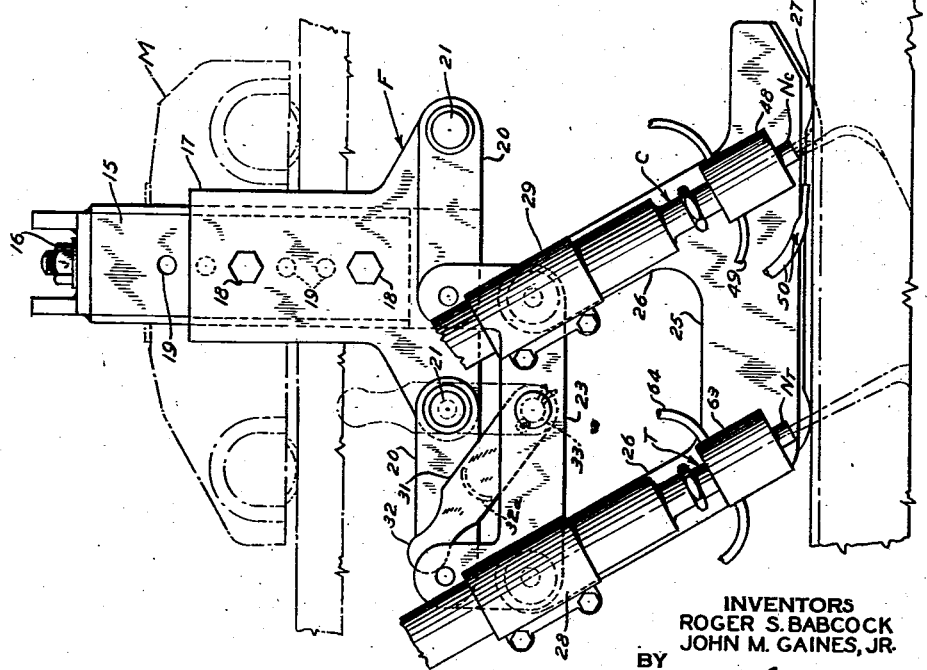

Referring to the drawings, and particularly to Figs. 1 and 2, one form of apparatus for producing a smooth cut in a metallic body or workpiece W, may comprise a cutting torch or blowpipe C provided with a cutting nozzle $N_c$, and a trimming torch or blowpipe T having a special trimming nozzle $N_t$. Both torches are carried by a suitable supporting frame F, which may be moved relatively to the work by a propelling machine M. It will be understood, however, that said torches may be mounted on a stationary part of the rolling mill so as to direct their jets on the moving slabs of metal.

The machine M may be of any suitable construction by means of which the speed of the cutting and trimming torches may be properly adjusted. That shown in dot and dash lines in the drawings is of the type disclosed in the application of Bucknam and Miller, Serial No. 1,470, filed January 12, 1935, and is adapted to be propelled along a track placed in any convenient position adjacent the work. It will be observed that the track shown in Figs. 1 and 2 is positioned above the level of the work, and the frame F is supported by an angular supporting member 15 which is removably secured to the machine M by any suitable means such as bolts 16.

As shown, the frame F comprises a main supporting plate or member 17, of inverted T shape, which is removably and adjustably attached to the angular member 15 by means of bolts 18 which are received in openings 19 provided in the member 15. Links 20 are pivotally mounted on the lower extremities of the T-shaped supporting member by means of pivot pins 21 and are maintained spaced therefrom by spacing sleeves 22 encircling the pivot pins. As shown in Fig. 1, each of the upper extremities of a U-shaped supporting or frame member 23 is pivotally connected in any suitable manner to the trailing end of one of the links 20. This member forms a support for a guiding plate 25 which has upwardly extending arms 26 by means of which said plate is secured to the supporting member. On the lower edge of the guiding plate, curved sliding portions 27 are provided, which portions may be either formed of or coated with a suitable heat resisting alloy, and are adapted to slide over the upper surfaces of the work. Trailing and leading torch-carrying sleeves 28 and 29, respectively, are also mounted on the lower extremities of the U-shaped supporting member by means of bolts 30. As shown in Fig. 1, the cutting torch C is removably and adjustably mounted in the leading sleeve 29 while the trimming torch T is removably and adjustably mounted in the trailing sleeve 28, and both of the torches are maintained a suitable distance from the surface of the work by the guiding plate 25. It may be noted at this point that the position of the cutting and trimming nozzles vertically above the surface of the work is not critical, and the main function of the guiding plate is to raise the nozzles over any irregular protuberances on such surface, although the nozzles should not be so far from the surface as to nullify the effect of the preheating flames.

It will be apparent that with the link construction of the supporting frame F, the torch assembly and guide plate are pivotally supported and adapted to slide over the surface of the work; and such a construction will allow the torch assembly to move up or down over any irregularities that may be encountered along the line of the cut. Manually operable means may also be provided for raising and holding the torch assembly away from the surface of the work when not in use. Such means may comprise a lever or member 31 having a handle 32 and, at its lower extremity, being pivoted by means of a pin 33 to the central portion of the U-shaped supporting member. Adjacent the handle 32, the member 31 is provided with an arc shaped latch 32a which is adapted to engage the end of the pivot pin 21, as indicated in dot and dash lines in Fig. 1, and hold the torch assembly away from the surface of the work. The assembly is rendered operative by disengaging the latch 32a from the pin 21 and allowing the handle to swing away from said pin.

Each of the cutting and trimming torches may be of any suitable and conventional construction including means for supplying cutting gas to the nozzle and means for mixing oxygen and fuel gas in proper proportion and supplying the mixture to the preheating orifices of the nozzle. Gases may be controlled and supplied to both torches in the usual manner from any convenient source of supply. The cutting nozzle Nc and the trimming nozzle Nt, however, are of special construction shown in Figs. 3 to 6 and Figs. 7 to 10, respectively, and will now be described.

Referring to Figs. 3 to 6, one form of cutting nozzle Nc with which the present high speed cutting method may be practiced, comprises an elongated body 35 having tapered seating surfaces 36 and 37 at one end thereof which are adapted to engage, and form a gas-tight seal, with similar seating surfaces in the head of the blowpipe or torch C. A central oxygen passage 38 extends longitudinally of the nozzle Nc. An insert or plug 39 is mounted in the outlet or discharge end of the nozzle and engages it with a press fit. This plug or insert is provided with a low velocity gas passage extending longitudinally therethrough and having a restricted entrance portion or metering orifice 40 and an enlarged cylindrical discharge portion or orifice 41. A high velocity discharge passage is also provided in the plug and such passage preferably has a flared entrance portion 42 and a divergent discharge portion or orifice 43, although the process can be accomplished at slightly reduced speeds with a cylindrical passage used in place of the divergent portion 43. The two passages are preferably located on the same diameter of the nozzle with their axes disposed in parallel relation. The construction and arrangement of the high and low velocity discharge passages is such that when oxygen at a pressure of about 100 pounds per square inch gage, for example, is supplied to the longitudinal passage 38, a jet having a velocity of approximately 500 feet per second will issue from the discharge portion 41 of the low velocity passage, while the jet issuing from the divergent discharge portion 43 of the high velocity passage will have a velocity of substantially 1380 feet per second.

A pressure range of 70 to 200 pounds per square inch gage in the passage 38, with exhaust velocities of 1300 to 1600 feet per second, has been found to be the practical working range of the high velocity passage 43, and such passages, designed for exhaust pressures of 4 to 8 pounds per square inch, are best adapted to the process. It should be understood, however, that the process is not confined to these pressure and velocity limits since they merely represent the optimum range of working conditions. Moreover, if cylindrical nozzles are employed, pressures of from 45 to 60 pounds per square inch are most satisfactory for carrying out the herein described process. It should also be understood that the metering orifice 40 is preferably constructed or adjusted to maintain a discharge velocity of approximately 500 feet per second in the passage 41, although this value again only represents the optimum condition, and velocities of from 200 to 1000 feet per second may be applied to the process.

In accordance with the usual practice employed with cutting nozzles, a plurality of heating gas passages 44, having restricted discharge portions 45, are provided in the body portion of the nozzle. These passages are arranged in spaced relation and disposed about the oxygen passage with the discharge portions 45 inclined toward the axis of the nozzle so that the axes of the discharge portions form elements of a cone. The high temperature heating flames produced at the discharge orifices of the passages 45 serve to heat to an ignition or kindling temperature the leading surface of the work in which a cut is to be made.

Figure 3:
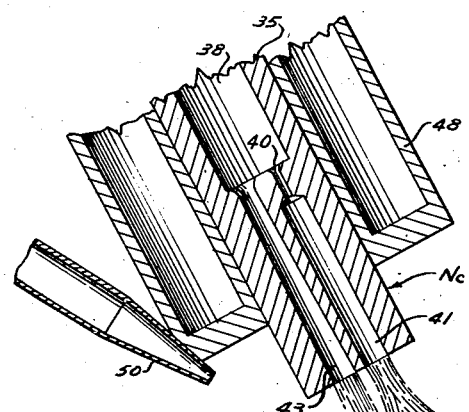
Fig. 3 is an enlarged fragmentary vertical sectional view, somewhat diagrammatic, of the cutting nozzle and showing the action of the oxygen jets.
Figure 3:
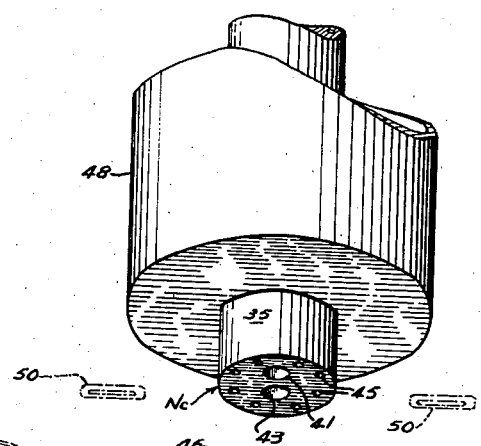
Figure 3:
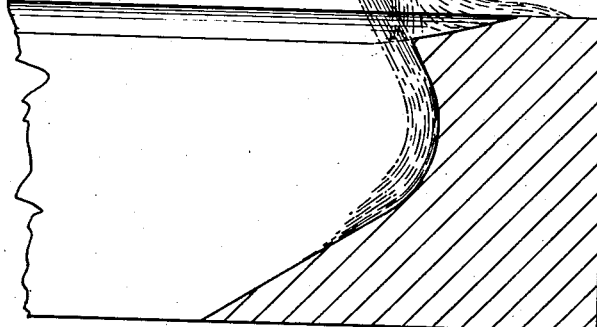

When the nozzle Nc is mounted in the blowpipe head, as shown in Figs. 1 and 2, with the low velocity deseaming orifice 41 arranged to precede the high velocity orifice 43, and the blowpipe is set at an angle of about 60° to the surface of the work, said blowpipe may be operated to sever the work at high speed. Before starting such operation, the preheating flames issuing from the discharge portions 45 are utilized to heat the metal initially to the kindling temperature. Then the cutting oxygen is turned on and jets of oxygen are discharged from the low velocity or deseaming orifice 41 and the high velocity orifice 43, as shown diagrammatically in Fig. 3, and the blowpipe is moved relatively to the surface of the work. The low velocity deseaming jet impinges on the surface and spreads slightly, producing a shallow groove 46 in the surface and forming a definite reaction zone or puddle of metal which serves as a most efficient source of preheat for the high velocity cutting stream. Furthermore, as a result of such a deseaming operation, all scale or oxide is removed from the surface before the cutting stream reaches it. As shown in Fig. 3, the high velocity cutting stream impinges on the surface in juxtaposed relation to the low velocity stream and at a point in the rear portion of the reaction zone produced by the deseaming stream, and due to its inherent characteristics, cuts through the film of molten metal, and downwardly through the remaining thickness of the work to form a kerf or cut 47. When cutting at top speed, the high velocity stream is deflected backwardly to a considerable extent by the uncut metal in the kerf and results in the production of lag which may reach as much as three inches on a bar two inches thick. This action is also shown in Fig. 3. It will be apparent that if the speed is increased further, the exhaust stream will fail to emerge from the bottom of the work, and a deep, straight walled groove will be produced.

Since the heat produced by the above described cutting operation may be great enough to cause damage to the cutting nozzle, it may be found desirable to cool said nozzle during cutting. This may be accomplished by providing a cylindrical water jacket 48 around the nozzle and near the outlet end thereof. Water may be supplied to the cooling jacket 48 through suitable conduits 49 from any suitable and convenient source of supply.

In the course of the cutting operation, the slag produced by the leading deseaming jet is thrown forward upon the surface of the work and tends to accumulate at the upper edges of the kerf and adhere tightly to the surface. Since undesirable surface conditions would result if this slag were allowed to remain, jets or blasts of any compressed non-combustible gas, such as oxygen, air, nitrogen, etc., may be applied to the surfaces of the work adjacent to the freshly cut edges. Such jets are applied by means of suitable tubes 50 disposed on either side and to the rear of the cutting nozzle $N_c$, as shown in Figs. 1 and 2. These tubes are arranged to direct the blasts of non-combustible gas upon the surface substantially parallel to the cut edge and to the surface in such a manner that they wash over the surface and effectively counteract the accumulation and adherence of the slag by chilling it before it comes to rest upon the surface of the work, and by forcing it away from the region of most intense heat. Similar jets may be employed on the lower side of the work also, if desired.

Figure 4:
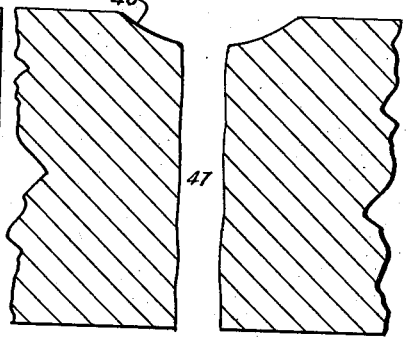
Fig. 4 is a fragmentary front elevational view, partly in section, of the nozzle and work shown in Fig. 3.
Figure 5:
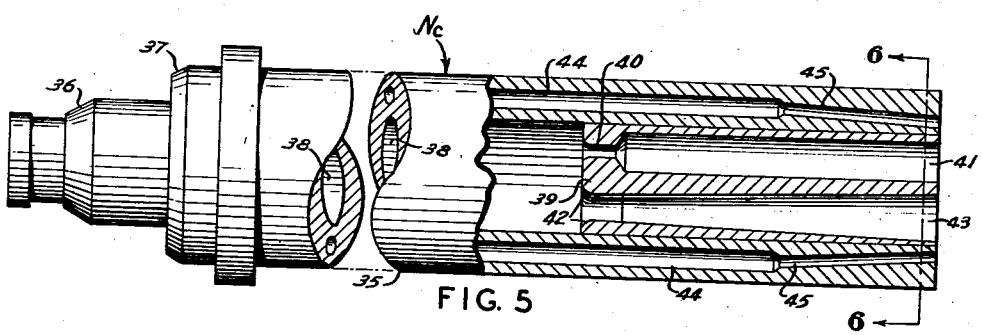
Fig. 5 is a view, partly in longitudinal section and partly in side elevation, showing the construction of the cutting nozzle;
Figure 6:
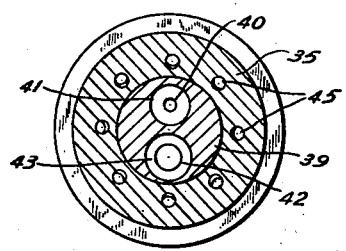
Fig. 6 is a transverse sectional view taken along the line 6—6 of Fig. 5.

It will be noted from Fig. 4 that the kerf 47 produced by the cutting nozzle is somewhat irregular in contour. This is due to the speed with which the process is carried out and the resultant scouring or mechanical eroding action of the slag and molten metal flowing downwardly through the kerf. While a cut of this character may be satisfactory in most cases for the further milling operations, it nevertheless is not sufficiently flat and square to meet the most exacting specifications. Hence, it may be desirable to perform a trimming or finishing operation on the newly formed kerf so as to remove any such irregularities or protuberances from the edges thereof. It is the function of the trimming nozzle $N_t$, referred to briefly above, to effect such a squaring of the edges of the kerf.

Referring to Figs. 7 to 10, it will be seen that the trimming nozzle $N_t$ is very similar in general construction to the cutting nozzle $N_c$ in that it comprises an elongated body 51 having tapered seating surfaces 52 and 53 at one end thereof which are adapted to engage and form a gas-tight seal with similar seating surfaces in the head of the blowpipe or torch T. Likewise a central oxygen passage 54 is provided in the body portion of the nozzle and such passage extends longitudinally thereof and has an insert or plug 55 mounted in and having a press fit with the outlet or discharge end thereof. The plug or insert 55, however, is different from the insert 39 and is provided with two cylindrical passages 56 which extend longitudinally through the plug and terminate in discharge orifices 58. The two cutting gas passages may be located on a common diameter of the nozzle with one passage on either side of the axis thereof. Moreover, the axis of each passage may be parallel to the axis of the nozzle, although it has been found preferable to have the passages diverge slightly from one another as they approach the discharge orifices, an angle of about $2\frac{1}{2}°$ between the axes of the passages having been found to be satisfactory.

Any suitable form of preheat may be employed and, as shown, a series of passages 60 having restricted discharge portions 61 arranged in converging relation with respect to the axis of the nozzle, similarly to the discharge portions 45, and uniformly spaced upon a circle surrounding both oxygen passages, may be provided. Since some of the flames issuing from such orifices will be directly over the kerf and will therefore contact no metal and serve no particularly useful purpose, certain of the passages may be omitted leaving those whose flames issue at points immediately in advance of each oxygen stream.

Figures 7, 8:
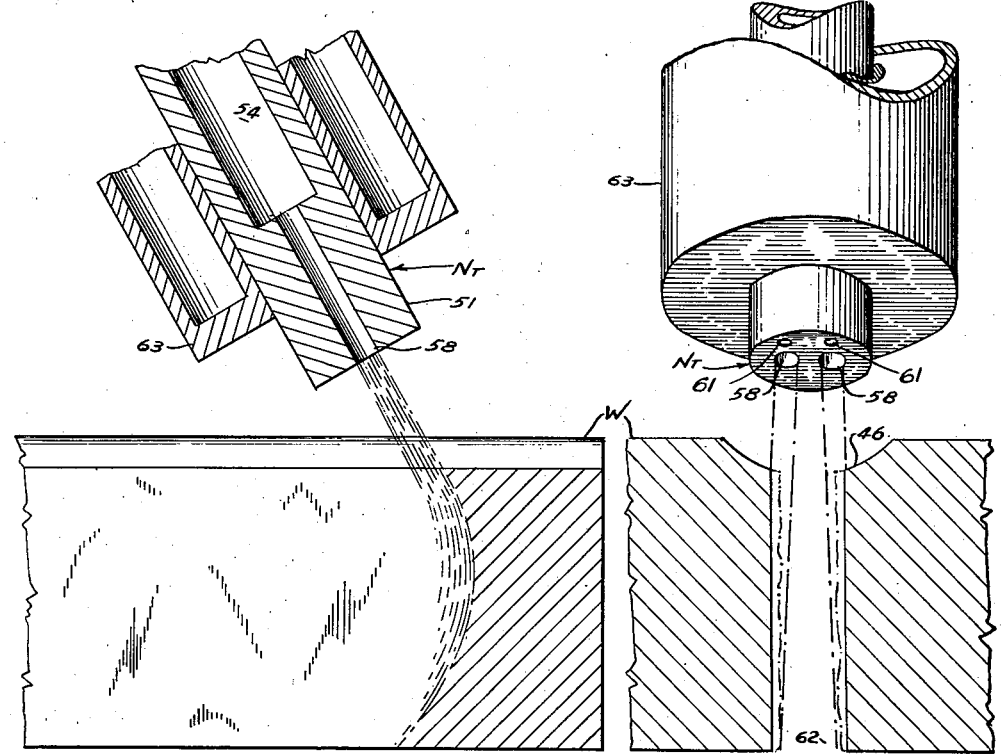
Figs. 7 and 8 are views similar to Figs. 3 and 4 showing the trimming nozzle and the action of its oxygen jets;
Figure 9:
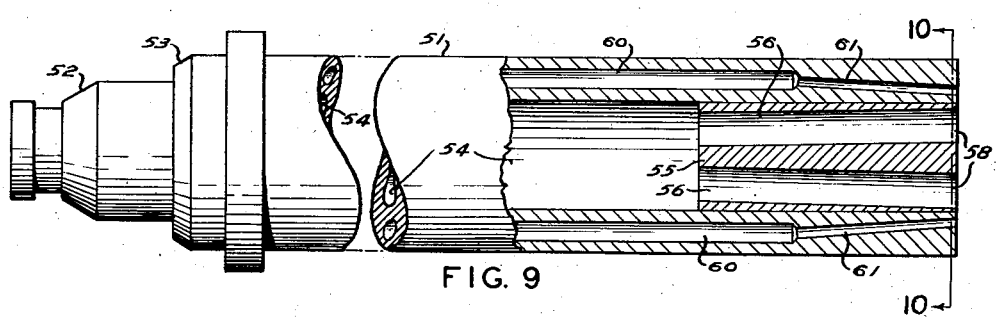
Fig. 9 is a view, partly in longitudinal section and partly in side elevation, showing the construction of the trimming nozzle.
Figure 10:
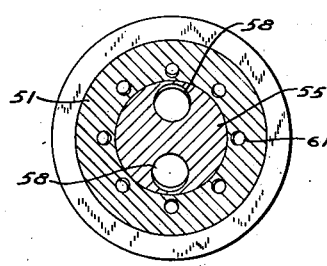
Fig. 10 is a transverse sectional view taken along the line 10—10 of Fig. 9.

When the above described nozzle is mounted in the head of the blowpipe or torch T and arranged at an angle of approximately 60° to the surface of the work with the diameter upon which the orifices 58 are located being perpendicular to the line of the cut, said nozzle may be effectively employed to trim the edge faces of a kerf produced by the cutting nozzle which has been described above. With the particular arrangement of trimming nozzle described, the streams of oxygen issuing from the orifices 58 will not be perpendicular to the plate surface or parallel to the edge faces of the kerf, but will be directed upon such edge faces at a slight angle and thereby effectively remove any irregularities or protuberances thereon. The action of these trimming jets is illustrated in Figs. 7 and 8 where it will be seen that, though the kerf 47 is widened slightly, the irregular portions 62 on the edge faces will be removed.

Although the heat in the vicinity of the trimming nozzle may not be as intense as that around the cutting nozzle, it may nevertheless be desirable to cool the trimming nozzle by providing a water jacket 63 which is adapted to encircle said nozzle. Water may be supplied to the cooling water jacket 63 from any convenient source of supply through suitable conduits 64 (Fig. 1) connected thereto.

It will be understood that for cutting at different speeds and on different thicknesses of metal, the trimming nozzle may be made in two pieces with one oxygen passage and associated heating gas passages in each piece. With such a construction the two streams of trimming oxygen would be adjustable as to the lateral separation between them. Moreover, it will be understood that in cutting hot heavy sections where it is desirable to carry the main cutting stream substantially perpendicular to the surface of the work, a reaction zone may be maintained by two low velocity streams originating behind and on either side of the cutting stream and intersecting directly ahead of it on the metal surface.

Various other changes may be made in the construction, and certain features thereof may be employed without others without departing from the present invention or sacrificing any of its advantages.

What is claimed is:

1. A method of cutting metallic bodies at high speed, which comprises heating the metal to the kindling temperature, and progressively applying oxidizing gas upon the heated surface in such a manner that a portion of said oxidizing gas produces a deseaming puddle on the surface of the metallic body so as to preheat the metal effectively for complete severing, and the remainder of said oxidizing gas progressively penetrates through the parts of said metallic body at the rear of said puddle to produce a kerf therein.

2. A method of cutting metallic bodies, which comprises initially raising a portion of the metal to the kindling temperature; progressively applying a stream of oxidizing gas to the surface of the heated metal in such a manner that said stream will have a low velocity portion and a high velocity portion; progressively projecting said low velocity portion along the line of cut to form a deseaming puddle on the surface of said metal for maintaining an efficient preheat; and progressively projecting the high velocity portion of said stream against parts of said metal preheated by said puddle for cutting into said metallic body.

3. In a method of cutting metallic bodies, the steps comprising progressively and simultaneously applying juxtaposed low velocity and high velocity oxidizing gas jets against the surface of said metallic body and along the line of cut.

4. A method of cutting metallic bodies at high speed, which comprises applying at least one forwardly inclined low velocity oxidizing gas stream to a surface of said metallic body; relatively moving said gas stream and said body; and during such relative movement applying to such surface another oxidizing gas stream of higher velocity than the first stream and adapted to contact the surface to the rear of and immediately adjacent to said first mentioned gas stream.

5. In a method of cutting metallic bodies, the steps comprising projecting a low velocity stream of oxidizing gas on the surface of the metallic body so as to form a molten puddle thereon, and simultaneously therewith directing a high velocity stream of cutting gas into said puddle.

6. The method of cutting metallic objects, which comprises applying an oxidizing gas stream having a velocity below 1000 feet per second at a forward inclination to the surface, the surface metal impinged by said stream being at its ignition temperature so as to form a reaction puddle; progressively advancing said gas stream in the direction that the cut is to be effected; and during such advance of said gas stream impinging a second oxidizing gas stream toward the rearward end of the puddle, said second gas stream having a velocity greater than 1000 feet per second and being effective to penetrate through the metallic object so as to produce a kerf therein.

7. A method of cutting metallic bodies, which comprises applying an oxidizing gas stream of low velocity to the surface of the body, the surface metal impinged by said stream being at its ignition temperature so as to form a reaction puddle; progressively advancing said gas stream in the direction that the cut is to be effected; during such advance of said gas stream applying a second oxidizing gas stream of high velocity toward the rearward end of said puddle so as to penetrate through the metallic body to produce a kerf therein; and during the advance of said second gas stream applying an additional oxidizing gas stream to an edge surface of the kerf produced so as to remove any protruding metal from such edge surface.

8. A method of cutting metallic bodies, which comprises preheating the surface to the ignition temperature; applying an oxidizing gas stream to such heated surface so as to penetrate through the metallic body and produce a kerf therein; and during the advance of said oxidizing gas stream applying an additional oxidizing gas stream to an edge surface of the kerf produced by said first stream so as to smooth such edge surface.

9. A method of cutting metallic bodies, which comprises preheating the surface to the ignition temperature; applying an oxidizing gas stream to such heated surface so as to penetrate through the metallic body and produce a kerf therein; and during the advance of said gas stream applying an additional oxidizing gas stream to both edge surfaces of the kerf produced so as to smooth such edge surfaces.

10. A method of cutting metallic bodies, which comprises preheating the surface to the ignition temperature; applying an oxidizing gas stream to such heated surface so as to penetrate through the metallic body and produce a kerf therein having substantially parallel walls; and during the advance of said gas stream applying an additional oxidizing gas stream to each edge surface of the kerf produced by said first stream so as to smooth such edge surfaces, said additional streams of oxygen being positioned divergently so that each is directed at a slight angle transversely from the vertical against the edge surface upon which it impinges.

11. A method of removing the protruding metal from or smoothing the flame-cut edge surfaces of a newly formed hot kerf, which comprises directing a stream of oxidizing gas against each of said edge surfaces simultaneously with the cutting operation; and progressively advancing such streams along said kerf.

12. A process of flame-cutting a metal body which comprises advancing an oxidizing jet at high speed relatively to said metal body to produce a rough and irregular kerf therein; and concurrently therewith advancing a second oxidizing jet behind and substantially parallel with said first jet, said second jet passing through said kerf and being so directed as to plane a thin layer from one of the walls of said rough kerf.

13. In a process of cutting metal wherein a high-velocity oxidizing jet is directed against a surface of and advanced relatively to a body of metal to form a kerf therein, the step comprising inclining said jet forwardly in the direction of cut to such an extent that a low-velocity fringe of said oxidizing jet extends forwardly over the uncut portion of said surface; and forming a shallow groove in the surface of the uncut portion by oxidization reaction of the metal with said low velocity fringe, the exothermic heat from which oxidization assists in preheating the metal for the high-velocity oxidizing jet.

14. A process for rapidly severing a body of ferrous metal which comprises applying a heating jet and an oxidizing jet from blowpipe means against a surface of said body while maintaining the rate of relative movement of said blowpipe means and said body higher than the rate conventionally employed for flame severing and while maintaining the velocity of said oxidizing jet sufficiently high to penetrate entirely through said body and produce a severing kerf having the surfaces of its walls more irregular than those produced by conventional flame severing; and concurrently advancing another oxidizing jet along said kerf and behind the first oxidizing jet while directing such other jet transversely of the irregular surface of one of said walls to remove irregularities from such surface and produce a smoother finish thereon.

15. A method of removing the protruding metal from or smoothing the flame-cut edge surfaces of a newly formed hot kerf, which comprises directing a stream of oxidizing gas having a velocity of less than 1000 feet per second against each of said edge surfaces; and progressively advancing such streams along said kerf.

16. A method of removing the protruding metal from or smoothing the edge surfaces of a newly formed hot kerf, which comprises simultaneously directing a stream of oxidizing gas having a velocity of less than 1000 feet per second against each of said edge surfaces while progressively advancing the same along the kerf, said gas streams being directed against said edge surfaces at a slight angle thereto and in such a manner that the angle between the gas streams is approximately two and one-half degrees.

17. A method of cutting metallic bodies, which comprises progressively preheating the surface to the ignition temperature; progressively applying an oxidizing gas stream to such heated surface so as to penetrate through the metallic body and produce a kerf therein; and applying a stream of non-combustible gas along and substantially parallel to said surface and adjacent to a freshly cut edge of the kerf so as to counteract the accumulation and adherence of slag.

18. Method as claimed in claim 17 wherein said stream of non-combustible gas comprises oxygen applied so as to wash over said surface and engage said slag while said slag is in a molten state.

19. A method of cutting a metallic body, which comprises applying a high temperature heating medium progressively along the line of cut to preheat successive portions of the body to the ignition temperature; applying a stream of cutting oxygen to said portions, as they are heated by said medium, to penetrate through said body and produce a kerf; and progressively applying a stream of non-combustible gas in the direction of cut against and substantially parallel to said surface adjacent to a freshly cut edge of the kerf, so as to counteract the accumulation and adherence of slag along said edge.

20. A method as claimed in claim 19, in which said stream of non-combustible gas is an air blast and is applied behind the point of impingement of said stream of cutting oxygen on opposite sides of said kerf.

21. Apparatus for cutting a body of metal at high speed, comprising the combination of supporting means adapted to slide upon the surface of the body and be moved relatively thereto; means carried by said supporting means at a constant distance above said surface for applying a low velocity stream of oxidizing gas to the surface of said body; and means also carried by said supporting means for applying a high velocity stream of oxidizing gas to said surface.

22. Apparatus for producing a smooth kerf in a body of metal at high speed, comprising the combination of means for initially heating a portion of the body to the kindling temperature; means for progressively applying a low velocity forwardly inclined stream of oxidizing gas to the surface of the body to produce a deseaming puddle thereon; means for progressively applying a high velocity stream of oxidizing gas in the rearward portion of such puddle so as to produce a kerf in said body; and means for progressively directing a stream of oxidizing gas upon each edge face of the kerf produced so as to smooth said edge faces.

23. Apparatus for producing a smooth kerf in a body of metal, comprising the combination of means for initially heating a portion of the body to the kindling temperature; means for progressively applying at least one stream of oxidizing gas to the heated surface so as to form a kerf therein; and means for progressively directing a stream of oxidizing gas upon each edge face of the kerf produced so as to smooth said edge faces.

24. Apparatus for producing a kerf in a body of metal, comprising the combination of a plurality of cutting torches; means for supporting said torches in alignment with respect to the kerf and at predetermined distances one from another; and means engaging the supporting surface for maintaining said torches at uniform distances from the surface of the metal body as said supporting means is moved relatively thereto.

25. A process of cutting and trimming metal which comprises advancing an oxidizing jet relatively to the metal to produce a kerf through said metal; and concurrently therewith advancing a second oxidizing jet through said kerf in substantial alignment with but offset slightly laterally from the central plane of said kerf to trim one of the walls of said kerf.

ROGER S. BABCOCK.
JOHN M. GAINES, JR.